May 3, 1966 P. E. DIAMANT ETAL 3,249,554
APPARATUS FOR BREAKING FOAM
Filed March 9, 1962 2 Sheets-Sheet 1

INVENTORS
PHILIP E. DIAMANT
EVERETT A. HARRIS
STANLEY E. JACKE
BY
ATTORNEY

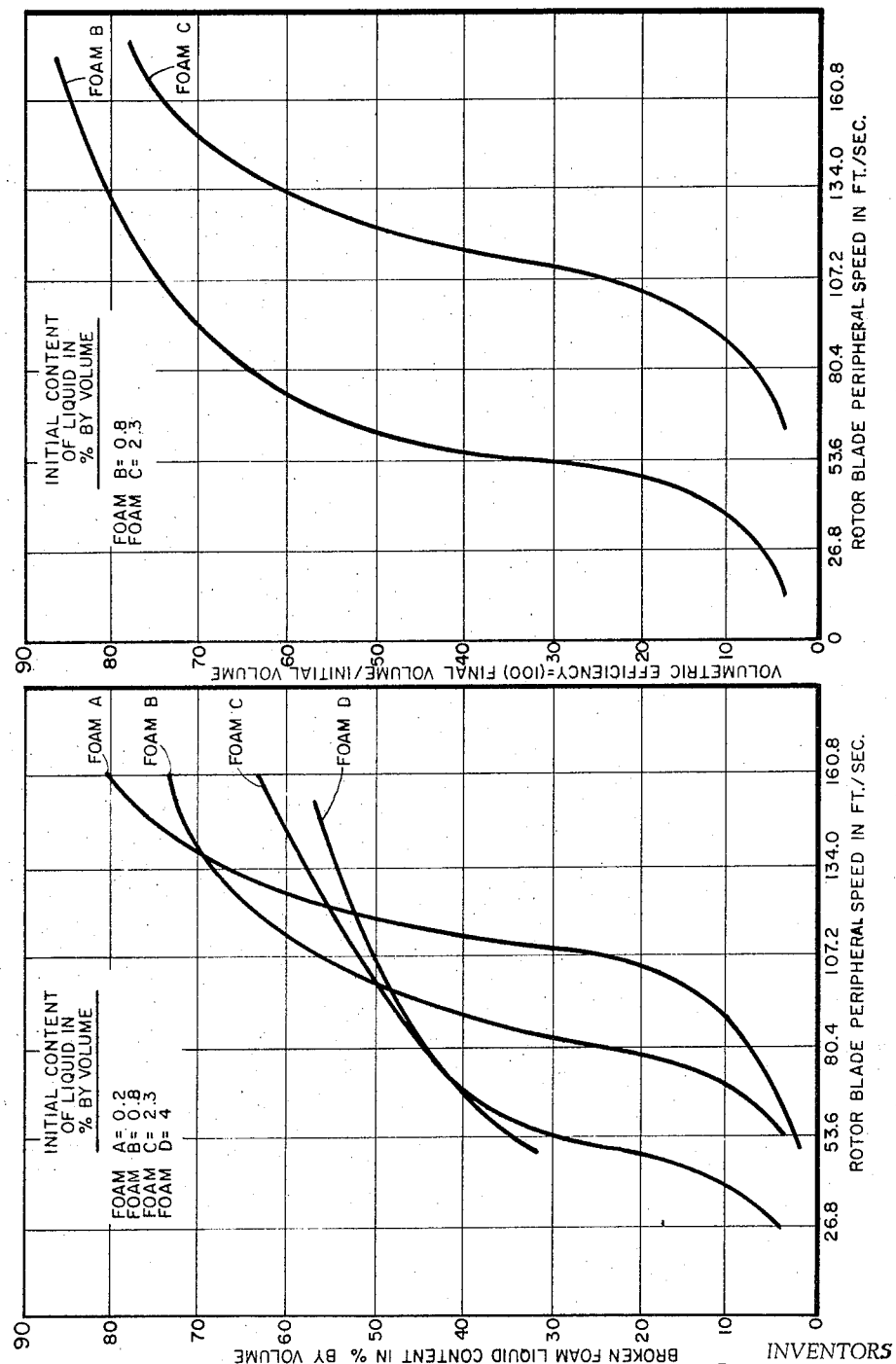

United States Patent Office

3,249,554
Patented May 3, 1966

3,249,554
APPARATUS FOR BREAKING FOAM
Philip E. Diamant, Stamford, Everett A. Harris, Norwalk, and Stanley E. Jacke, Ridgefield, Conn., assignors, by mesne assignments, to Mixing Equipment Co., Inc., Rochester, N.Y., a corporation of New York
Filed Mar. 9, 1962, Ser. No. 178,775
2 Claims. (Cl. 252—361)

This invention relates to a method and apparatus for breaking foam or for greatly reducing its volume.

In many industrial operations involving the treatment of liquids, foaming is an extremely serious problem. In some cases a sudden increase of foam may cause overflows which are dangerous, and even where the increase in foam is not so extreme it constitutes a serious economic cost. For example, in a chemical process in which foam is encountered, equipment, such as kettles, can be used to only a portion of their full volume because it is necessary to provide sufficient free space above the liquid level so that foam will not interfere. This always is an additional cost because equipment is used at a lower output capacity than would otherwise be possible, and in some cases there is also a serious qualitative disadvantage. For example in a chemical reaction in which it is not desired to permit excessive oxidation the necessity of providing a very large amount of free air space above the liquid level in a kettle may lead to a greater amount of undesired reaction and so reduce the quality as well as the quantity of product produced from a given piece of equipment in a unit time. These are only a few of the practical and serious drawbacks to foaming. When the amount or stability of foam is too great the foam becomes troublesome and this is the problem with which the present invention deals.

In the past various methods of handling foam have been proposed. In some cases where an entirely open vessel is present skimmers and foam launders may be employed. In other cases where this simple procedure is inapplicable the foam has been pumped and broken by violent contact with walls, or by pumping through fine spray nozzles. It has also been attempted to break foam by violent sonic vibration. The two methods formerly used referred to first above are typified by U.S. Patents 1,449,114 and 2,184,195.

The various methods employed for breaking or reducing foam have had various degrees of success but none of them have been completely satisfactory. As a result it is still general practice to allow large air spaces above normal liquid levels or to use chemical defoamers where foaming is to be encountered.

Before considering the operation of the present invention, certain general considerations and definitions should be set out. First the nature of troublesome foam will be considered. Foam is a more or less homogeneous two-phase liquid-gas system in which bubbles of gas form the disperse phase while the liquid is the continuous phase. Foam may be considered in terms of two characteristics. The first characteristic is relative foam density which is defined as a percentage $$\frac{\text{wt. of unit vol. foam}}{\text{wt. of unit vol. of pure liquid}} \times 100\%$$

For practical purposes no system having a relative density of more than 40% will be considered as foam. The vast majority of foams are very much less dense and have relative densities below 15%, and frequently less than 5%.

The second characteristic of troublesome foam is a moderate stability, and any system which on standing separates more or less completely into liquid and gas in less than one minute is not considered to be a troublesome foam. Thus, for example, when soda water is poured into a glass in the absence of protective colloids the temporary formation of bubbles at the surface would not fit the present definition of foam. Such a system which spontaneously breaks up into gas and liquid normally does not present any industrial problem. For the most part foams will maintain themselves for a number of minutes and a common test, such as is described in Patent No. 2,315,983 measures foam at the end of five minutes. At the other extreme certain foams are so stable that they may fail to separate into their constituents for days or weeks. It will thus be seen that as far as stability is concerned there is an enormous range covered by the term "foam." It is significant to note that the present invention can effect marked volume reduction with such an enormous range of different products.

The exact nature of foam has been difficult to determine except that it is known to be a result of surface tension in the film around each bubble. Foams exhibit to a considerable degree the phenomenon of resilience or elastic recovery after external mechanical shock. For example, lead shot, cork balls, drops of mercury and even streams of water have been passed through foam films without causing the film as a whole to rupture. This has been explained in terms of excess concentration of a solute at the surface of the bubbles. The excess concentration is defined by the following equation:

$$u = \frac{c}{RT} \frac{d\gamma}{dc}$$

where $u$ is the excess concentration at the surface, $c$ is the bulk concentration, $d\gamma/dc$ is the change of surface tension with concentration of solute, R is the gas constant and T is the absolute temperature.

In an article by Ross in the Encyclopedia of Chemistry edited by Clark and published by Reinhold it is pointed out that an important factor in the stability of foam is the water or other liquid in the film. As the foam gets older it loses liquid and finally becomes brittle and ultimately collapses.

The present invention operates by transforming the foam into another two-phase dispersion of gas and liquid which appears homogeneous but which on standing separates into pure liquid and a small amount of foam, or in the case of very easily broken foam may sometimes completely separate into liquid and gas. This change is brought about by a procedure which, as will be pointed out below, markedly increases the liquid content of the system into which the foam is transformed. In other words it produces a system which in terms of the above classical foam definition should be more stable rather than less stable since the amount of liquid has been greatly increased. It is not known just why this anomalous result occurs and it is not intended to limit the invention to any particular theory or mechanism. All that is definitely known is that in the present invention the relative density of what was formerly foam is markedly increased to 50%, or more, and in some cases to 80 or 90%. Visually the system formed appears homogeneous and looks like foam. Whether the system is changed and the stability is sharply reversed after the increase in liquid content has gone beyond a certain point or whether there are actually present two or more systems temporarily mixed together, for example pure liquid and some foam, has not been determined. All that is known is that when it reaches a quiescent zone the new system or mixture of systems breaks down and a marked overall reduction in volume results.

It will be noted that except for the sonic approaches and the skimming off of foam which does not break it, what has been done is to pump the foam rapidly and then either to cause it to impinge against a wall and be suddenly stopped or force it through a fine spray nozzle which is in effect doing the same thing. The present invention operates in a diametrically opposed manner. The froth is contacted with rapidly moving surfaces, the relative movement being at least 80 feet per second. The effluent two-phase system is not pumped by enclosing or directing it although it may contact distant walls. This contact with the walls is not the phenomenon which is used in breaking the foam, however. In fact ideally after contact with the rapidly moving surfaces the best results could be achieved with walls so far away that the broken foam has lost almost all of its velocity when it encounters them. In practical machines the extreme would result in a machine which is unnecessarily bulky, and so there are confining walls, but they are so far away from the rapidly moving surfaces that they reduce the classical pumping and/or impingement effect to a very low figure, within wide limits the lower the better.

The exact shape and form of the moving surfaces are not particularly critical. The most practical engineering design is in the form of a rotor with the axial entrance for the foam almost the full diameter of the rotor. It is not encased in close fitting walls as is necessary for effective pumping and on the contrary such walls as there are are so far away that slowing of the broken foam after leaving the rapidly moving vanes takes place. Efficiency of final volume reduction increases as the walls are further and further removed, but the increase in this efficiency is asymptotic with distance, thus confining and flow directing walls are normally placed at a sufficient distance from the moving surfaces, which transform the foam, that the loss in efficiency is economically negligible. It is thus possible to build compact apparatus with only a small loss in efficiency. This is an illustration of another advantage of the present invention that as far as actual construction is concerned there are no critical limits or dimensions to wall spacing.

There is some variation in the minimum speed of surfaces with different foams and the 80 feet a second speed is correct for a volume reduction of the foams most easily transformed. The speed of the surfaces is the speed at which the surface strikes foam substantially normal to the surface extent. In the case of the preferred form, namely a blower type device, this is, of course, the peripheral speed of the blades. The output product in these cases contains at least 50% of liquid. The curve of surface speed versus liquid content of the output, or as one might put it, output quality, is in the form of an S curve. At very slow speeds there is little effect and little change with speed until a speed is reached at which the increase in output liquid content rises extremely rapidly. Further increases in speed tend to flatten off the curve. The lower speed limit is usually located in the upper portion of the steep part of the S curve.

With light foams, for example foams produced by soap and similar detergents, the minimum speed will be affected to a considerable extent by the liquid content of the foam. Here again the present invention departs from past experience with foams. In general, for a particular relatively low density foam, as the density rises, that is to say as the liquid content of the foam increases, lower speeds of the moving surfaces suffice. For example, the minimum speed of 80 feet per second will serve to produce a marked reduction in volume with foams approaching 1% relative density, whereas higher speeds are necessary with foams of approximately 0.2% density. In other words, the very foams which were considered to be most stable are among the easiest to break or reduce in volume by the present invention.

There is always a fairly critical lower speed below which the foam may change its bubble size, but without breaking into a different two-phase system having a relative density of 50% or over. The anomalous behavior with foam density applies only to the same kind of foam.

For example, certain very stable foams, an example of which will be described below, have special ingredients which greatly affect the surface tension of the bubbles and some of these very stable foams may have nearly 40% density and because of their enormous stability require a somewhat higher minimum speed of contact with the moving surfaces.

The speed of contact of the foam with the moving surfaces is a speed normal to the surface. Apparatus such as an effective centrifugal pump which causes foam to encounter moving surfaces at a very flat angle and accelerates the foam along the surface to speeds which may be considerably greater than the foam breaking speed of the present invention does not produce the same result. The speed must be measured substantially normal to the moving surfaces.

When the present invention is observed visually in apparatus with transparent walls both the incoming foam and the outgoing two-phase system appear homogeneous although the latter on short standing clarifies to a large extent. It is theoretically conceivable that at the instant any foam bubble is struck by the rapidly moving surface there is complete separation into gas and liquid, and that a portion reforms as the mixture reaches slower speeds. Visually this does not appear to take place but the period of contact of the foam bubbles with the rapidly moving surfaces is so extremely brief that the complete separation and partial reformation cannot rigidly be excluded. Therefore, the present invention is defined in terms of final output system, that is to say the system after it has moved a significant distance from the rapidly moving metal surfaces. We are dealing with a practical method and apparatus for solving a serious problem. The exact theoretical mechanism is, therefore, not important and is not intended to limit the present invention.

The invention will be described in greater detail in conjunction with the drawings in which:

FIG. 2 is a family of curves for various foams;

FIG. 3 is a pair of curves taken from FIG. 2 drawn in terms of volumetric efficiency.

Figure 4:
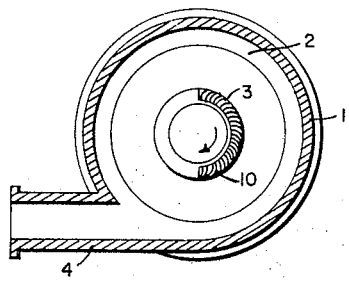
FIG. 4 is a cross-sectional view of the apparatus of FIG. 1, which view has been taken as indicated by the offset sectioning plane 4—4 in FIG. 1.
Figure 1:
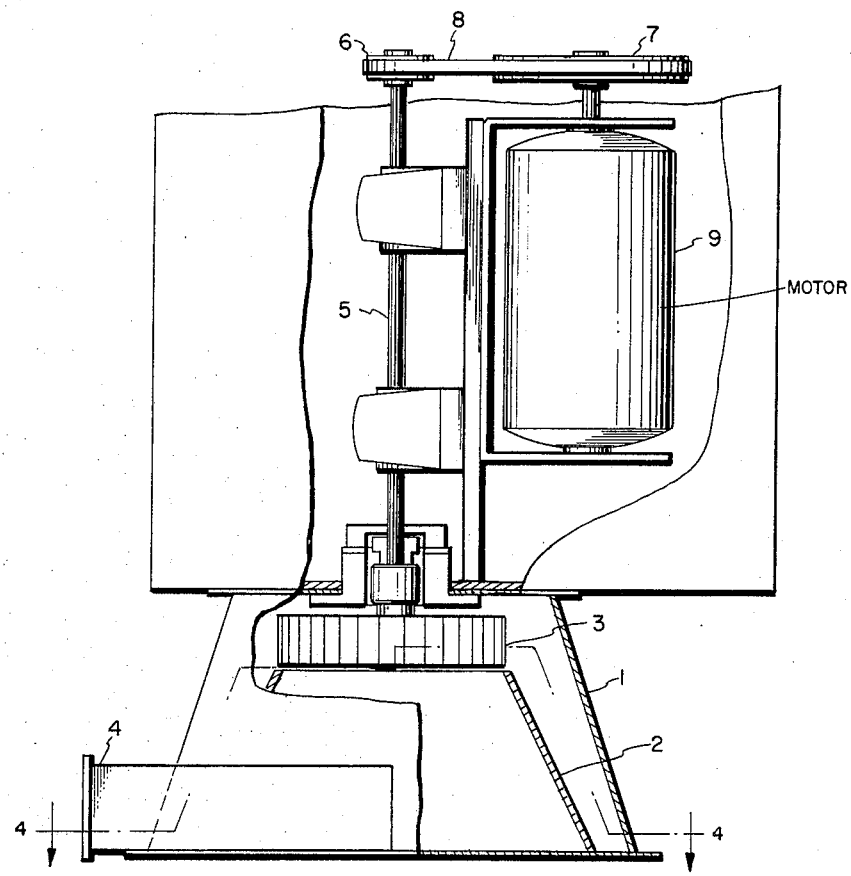
FIG. 1 is an elevation, partly broken away, of a typical foam breaking apparatus.

FIG. 1 illustrates a typical apparatus for controlling the foam on a kettle or other container. An outer or shroud wall 1 is spaced from an inner inlet conduit wall 2 to form a wide, only slightly confined output conduit. A rotor 3 similar to those used in air blowers, which is hollow, draws up foam through the inlet conduit and discharges an apparently homogeneous two-phase system into the outlet conduit, which finally flows off through a large outlet 4 to a zone of relative quiescence. This may be an external tank. The outlet 4 in some cases may communicate with the kettle which may function as a clarification tank. The rotor 3 is rotated at the desired speed by shaft 5 which carries a pulley 6. This in turn is driven by a belt 8 from a pulley 7 on the shaft of a motor 9. The rotor is shown in section in FIG. 4 and is provided with blades 10. It will be noted that the blades are relatively short because as has been stated above it is the peripheral speed of the blades which counts in determining the minimum speed with which the blade surfaces strike foam bubbles at substantially normal incidence.

The speed at which the rotor is turned depends on its size; with a small laboratory or pilot apparatus it may be approximately 6000 r.p.m. for a blade speed of 80 feet per second. With a very large apparatus with rotors of much larger periphery the revolutions for a given blade speed are, of course, correspondingly much smaller.

FIG. 2 illustrates a family of curves obtained from foam produced with a synthetic surfactant of different liquid content by volume. Each curve is labelled with the percentage of liquid by volume in the initial foam. The curve marked 0.8% is typical of a wide variety of foams. For this curve the production of an output system with 50% liquid occurs just above 80 feet per second. There are some foams which break more easily and permit operations down to 80 feet per second. It will be noted that the dryer foam with 0.2% liquid does not break until the speed of about 110 feet per second is reached. On the other hand, the curve for 2.3% liquid breaks reasonably at a slightly lower speed but the curve does not have the typical S shape to so marked a degree. The 4% curve shows somewhat more difficulty in breaking and represents a type of surfactant foam less frequently encountered. The 0.8% foam is a typical curve for the average type of foam.

FIG. 3 shows the curves for 0.8% liquid and 2.3% liquid foams expressed in a little different way, namely in terms of volumetric efficiency. This corresponds to the overall reduction of volume more closely than do the corresponding curves of FIG. 2. After all, the practical result desired is to reduce the total volume of foam and this is more clearly brought out in the curves of FIG. 3.

The description above with typical foams, such as those produced by soaps and synthetic surfactants or frothers, represents the vast majority of foams encountered in industry. However, it is an important advantage of the present invention that it can even be used with extremely stable and heavy foams, requiring, however, higher contact speeds. Probably the most extreme situation is presented with water solutions of polyvinyl alcohol. When beaten into a froth with air the relative density is 37.5% and the foam is stable for many hours. When contacted with a rotor as described above with a speed of contact of about 200 feet per second the foam is transformed into a system the volume of which has been decreased by a factor of about 2.25 and this system separates into a small amount of foam and pure liquid in five minutes.

It should be noted that with the extreme density and stable foam produced from the polyvinyl alcohol solution the reduction in volume is only a little over 2, as against a reduction of from a little over 80 times for the 0.8% foam to nearly 400 for the 0.2% foam both shown on the curves of FIG. 2 for a speed of about 160 feet/sec. Even the 2 to 1 reduction for the almost freakish polyvinyl alcohol foam represents a practically important result, though less spectacular than can be achieved with the normal much lighter foams.

The foams and the systems into which they are transformed have been referred to as two-phase systems. This correctly describes the bubbles themselves. It should be understood that sometimes the foam carries very finely divided solids as for instance, froth flotation froths or foams. When these are broken by the present invention the finely divided solids flow away with the liquid.

We claim:
1. Apparatus for breaking foam, which comprises:
(a) a generally horizontally oriented, vertically axled, motor driven, squirrel cage rotor disposed in a relatively open space and having an inlet at the bottom thereof;
(b) a plurality of blades spaced around the periphery of said rotor so that each of said blades has a generally vertically rotationally forward-facing surface disposed for striking said foam;
(c) an upright frusto-conical inlet conduit superimposed directly above a foam generating container for guiding foam from said container to said bottom inlet of said rotor, the upper smaller opening of the frusto-conical conduit being immediately subjacent said bottom inlet;
(d) drive means for rotating said rotor at an angular velocity such that said surface of each blade strikes foam within said rotor at a relative speed of at least 80 feet per second normal to said foam;
(e) wall means disposed remote from said rotor for gathering the beaten product leaving said surfaces, said wall means being sufficiently spaced from said rotor so that said beaten product discharged from said rotor is markedly reduced in velocity before contacting any continuous extent of wall; and
(f) a discharge conduit in communication with said wall means for removing said beaten product to a relatively quiescent zone.

2. Apparatus for breaking foam, which comprises:
(a) a generally horizontally oriented, vertically axled, motor driven, squirrel cage rotor disposed in a relatively open space and having an inlet at the bottom thereof;
(b) a plurality of blades spaced around the periphery of said rotor so that each of said blades has a generally vertically rotationally forward-facing surface disposed for striking said foam;
(c) an upright inlet conduit superimposed directly above a foam generating container for guiding foam from said container to said bottom inlet of said rotor, the upper smaller opening of the conduit being immediately subjacent said bottom inlet;
(d) drive means for rotating said rotor at an angular velocity such that said surface of each blade strikes foam within said rotor at a relative speed of at least 80 feet per second normal to said foam;
(e) wall means disposed remote from said rotor for gathering the beaten product leaving said surfaces, said wall means being sufficiently spaced from said rotor so that said beaten product discharged from said rotor is markedly reduced in velocity before contacting any continuous extent of wall; and
(f) a discharge conduit in communication with said wall means for removing said beaten product to a relatively quiescent zone.

References Cited by the Examiner
UNITED STATES PATENTS

| | | | |
|---|---|---|---|
| 908,951 | 1/1909 | Carmichael | 252—361 X |
| 1,316,947 | 9/1919 | Wirth-Frey | 55—178 |
| 1,847,648 | 3/1932 | Harkom | 55—178 |
| 1,868,826 | 7/1932 | Guest | 55—178 |
| 2,401,469 | 6/1946 | Edwards | 252—361 X |
| 2,490,421 | 12/1949 | Denhard | 252—361 X |

NORMAN YUDKOFF, *Primary Examiner.*

J. SOFER, *Assistant Examiner.*